(12) United States Patent
Mitchell

(10) Patent No.: US 9,175,192 B2
(45) Date of Patent: Nov. 3, 2015

(54) METHOD FOR MANUFACTURING A LABEL LAMINATE

(75) Inventor: Noel Mitchell, Wuppertal (DE)

(73) Assignee: UPM RAFLATAC OY, Tampere (FI)

( * ) Notice: Subject to any disclaimer, the term of this patent is extended or adjusted under 35 U.S.C. 154(b) by 503 days.

(21) Appl. No.: 12/676,777

(22) PCT Filed: Sep. 6, 2007

(86) PCT No.: PCT/FI2007/050475
§ 371 (c)(1),
(2), (4) Date: Jul. 13, 2010

(87) PCT Pub. No.: WO2009/030803
PCT Pub. Date: Mar. 12, 2009

(65) Prior Publication Data
US 2010/0300616 A1    Dec. 2, 2010

(51) Int. Cl.
| C09J 7/02 | (2006.01) |
| B05D 3/12 | (2006.01) |
| B65C 9/24 | (2006.01) |
| B65C 9/25 | (2006.01) |
| B32B 17/10 | (2006.01) |
| B32B 38/14 | (2006.01) |
| B32B 37/02 | (2006.01) |
| G09F 3/10 | (2006.01) |
| B32B 38/10 | (2006.01) |

(52) U.S. Cl.
CPC ............... *C09J 7/0242* (2013.01); *B65C 9/24* (2013.01); *B65C 9/25* (2013.01); *C09J 7/0246* (2013.01); *G09F 3/10* (2013.01); *B05D 3/12* (2013.01); *C09J 2203/334* (2013.01)

(58) Field of Classification Search
CPC .. C09J 2203/334; C09J 7/0242; C09J 7/0246; B05D 3/12; B65C 9/24; B65C 9/25; G09F 3/10
USPC ..................... 156/289, 273.3, 283, 320, 386
See application file for complete search history.

(56) References Cited

U.S. PATENT DOCUMENTS 3,815,898 A * 6/1974 Haifley et al. .................... 271/65
4,568,403 A * 2/1986 Egan .............................. 156/247
(Continued)

FOREIGN PATENT DOCUMENTS

| CA | 2129908 A * | 2/1995 |
| CN | 1966595 | 5/2007 |

(Continued)

OTHER PUBLICATIONS

Definition of "activate". http://tinyurl.com/7bxlnzx, Nov. 29, 2011.*
(Continued)

*Primary Examiner* — Sonya Mazumdar
(74) *Attorney, Agent, or Firm* — Venable LLP; Eric J. Franklin

(57) ABSTRACT

A method for manufacturing a label laminate. A transparent plastic film having a first side and a second side is introduced. The second side of the transparent plastic film is printed. A release liner including a release surface and single layer of a non-tacky adhesive on the release surface is introduced. The non-tacky adhesive on the release surface is activated so that the non-tacky adhesive becomes tacky. The tacky adhesive is attached on the release surface to the second side of the transparent plastic film.

5 Claims, 1 Drawing Sheet

(56) References Cited

U.S. PATENT DOCUMENTS

| | | | |
|---|---|---|---|
| 4,707,211 A * | 11/1987 | Shibata | 156/354 |
| 4,880,683 A | 11/1989 | Stow | |
| 5,869,161 A * | 2/1999 | Choi | 428/41.7 |
| 5,908,527 A | 6/1999 | Abrams | |
| 6,298,894 B1 * | 10/2001 | Nagamoto et al. | 156/359 |
| 6,540,865 B1 * | 4/2003 | Miekka et al. | 156/249 |
| 6,994,262 B1 * | 2/2006 | Warther | 235/492 |
| 2001/0030020 A1 * | 10/2001 | Nandy et al. | 156/289 |
| 2002/0088154 A1 * | 7/2002 | Sandt et al. | 40/300 |
| 2002/0127361 A1 * | 9/2002 | Sandt et al. | 428/40.1 |
| 2004/0001931 A1 * | 1/2004 | Izzi et al. | 428/40.1 |
| 2004/0261936 A1 * | 12/2004 | Laney et al. | 156/229 |
| 2005/0142319 A1 * | 6/2005 | Virtanen | 428/40.1 |
| 2005/0191486 A1 | 9/2005 | Scholz | |
| 2006/0029760 A1 * | 2/2006 | Kreft et al. | 428/40.1 |
| 2007/0014985 A1 | 1/2007 | Yuan-Huffman et al. | |
| 2009/0120571 A1 * | 5/2009 | Rasmussen | 156/283 |
| 2012/0328891 A1 * | 12/2012 | Suwa et al. | 428/522 |

FOREIGN PATENT DOCUMENTS

| | | | |
|---|---|---|---|
| EP | 0 814 138 A2 | | 12/1997 |
| EP | 1 375 358 A1 | | 1/2004 |
| EP | 1743927 A2 | | 1/2007 |
| EP | 2450414 A1 | * | 5/2012 |
| RU | 94029674 | | 8/1994 |
| RU | 2010113000 A | * | 10/2011 |
| WO | WO90/13420 A1 | | 11/1990 |
| WO | WO-99/49440 A | | 9/1999 |
| WO | WO-99/49440 A1 | | 9/1999 |

OTHER PUBLICATIONS

Request for Substantive Examination for PCT/FI2007/050475; Aug. 12, 2011.*

Office action issued by Russian patent office in counterpart application 2010113000. Aug. 16, 2011.

PCT/ISA/210—International Search Report—Jun. 11, 2008.

PCT/IPEA/409—International Preliminary Report on Patentability—Nov. 12, 2009.

Extended European Search Report, dated Apr. 11, 2012, issued in connection with counterpart European Patent Application No. 12151672.8-1214.

First Office Action from the State Intellectual Property Office, P.R. China, dated Apr. 28, 2012, issued in counterpart Chinese Application No. 200780100525.0.

* cited by examiner

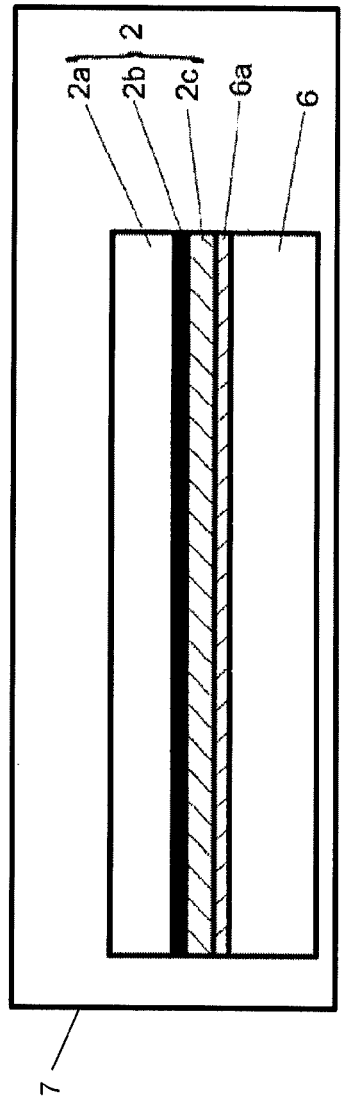
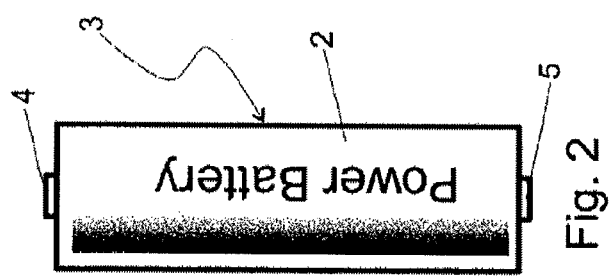
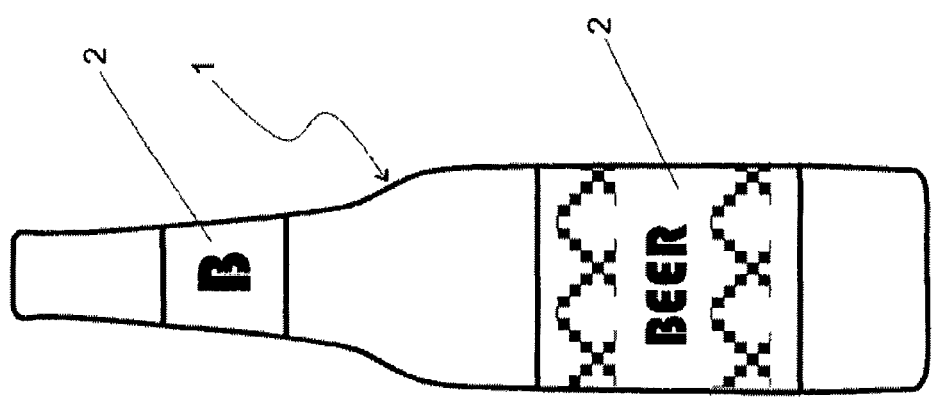

METHOD FOR MANUFACTURING A LABEL LAMINATE

CROSS-REFERENCE TO RELATED APPLICATIONS

This application is the national phase under 35 U.S.C. §371 of PCT/FI2007/050475 filed 6 Sep. 2007.

FIELD OF THE INVENTION

The present invention relates to a method for manufacturing a label laminate.

BACKGROUND OF THE INVENTION

Clear pressure-sensitive labels, in particular beer labels, are very often comprised of the following construction: A release liner of PET film is coated on one side with a release agent, commonly a silicone polymer, which is coated with a pressure-sensitive adhesive. This pressure-sensitive adhesive is dried at elevated temperature and after that a facestock is laminated onto the adhesive side. The adhesive then, under the pressure of the lamination process, transfers to the film facestock. The film facestock is typically a clear polypropylene film with a thickness typically between 20 and 60 microns.

This self-adhesive construction is then slit to the required narrow width suitable for further conversion by a pressure-sensitive label printer. The next step in the label production process is that the label printer prints a plain non-pressure-sensitive clear film, typically a BOPP or PET film, on the reverse side and then laminates this reverse-printed film with a suitable laminating adhesive to the pressure-sensitive construction supplied by the label-stock producer. This overlaminate typically has a thickness of between 12 and 40 microns.

This film is printed on the reverse side in order to provide scuff resistance to inks in addition to the fact that brilliant silver and gold metallic colours demanded by brand-owners, in this case breweries, can only be achieved when solvent-based silver inks are gravure-printed on the reverse side of a clear film which, when viewed from above, gives the high brilliance required due to the metallic pigments shining through the clear film.

The laminating adhesive used is most commonly a polyurethane adhesive, often solvent-based, which represents an environmental hazard as well as a fire and explosion risk. This whole process through the chain is complex, cumbersome and costly.

Publication U.S. Pat. No. 6,540,865 discloses a release liner which is coated with a release agent and subsequently coated with an adhesive, on top of which a second detackified layer (DL) is applied to the surface of the pressure sensitive adhesive forming a continuous film covering the PSA layer. This non-tacky layer allows the construction to be rolled-up and stored. It can then be later activated by heat for subsequent lamination to another substrate.

This detackified layer having typically a grammage of 10-15 g/m² and containing the preferred heat-sealable polyamide resin is very expensive, adding considerable cost and complexity to the overall construction.

In a commercial printing process operating at normal process speed, the activation of such a detackified layer and subsequent lamination to a clear plastic film will not yield a perfectly clear, water-white and imperfection-free film demanded by the beverage industry for clear labels.

Publication WO 99/49440 discloses a pressure-sensitive construction in which a pressure-sensitive adhesive is applied to a release-coated surface of a liner, and on top of the pressure-sensitive adhesive, a non- blocking non-preformed film material is applied which covers the pressure-sensitive layer, rendering it tack-free. Suitable film-forming materials include thermoplastic polymers, such as polyolefins, polyvinyl chloride, polyesters, or polyamides which could be extrusion coated or applied in a liquid or molten state to the top surface of the pressure-sensitive adhesive.

This construction comprising liner, pressure-sensitive adhesive and continuous film layer is claimed to be printable, die-cuttable, matrix-strippable, and dispensible, thereby eliminating the use of conventional facestock materials. Furthermore, it can be overlaminated with plain or preprinted clear overlaminating films. However, this is an extremely complex and costly manufacturing process.

SUMMARY OF THE INVENTION

The manufacturing method of the label laminate according to the invention comprises
- introducing a transparent plastic film having a first side and a second side,
- printing the second side of the transparent plastic film,
- introducing a release liner comprising a release surface and a single layer of a non-tacky adhesive on the release surface,
- activating the non-tacky adhesive on the release surface so that it becomes tacky, and
- attaching the tacky adhesive on the release surface to the second side of the transparent plastic film.

In the present invention, a release liner is coated with a non-tacky adhesive to form a single layer of a non-tacky and non-blocking coating. The adhesive-coated release liner can then be wound up, stored as long as required, and after that transported to a printer for further conversion to a pressure-sensitive label laminate.

The non-tacky adhesive is activated to become tacky by means of heat or radiation applied to the surface of the adhesive. The adhesive can be activated during the normal in-line printing and converting process of the printer at normal operating speeds. After that, the activated pressure-sensitive adhesive-coated liner is laminated to the in-line pre-printed transparent film by the printer to produce a construction in which the print is trapped between one layer of the transparent film and one single layer of adhesive applied to a release liner. The transparent printable film may be made of polypropylene (PP), polyester (PET), polyvinyl chloride (PVC), polylactic acid (PLA), polyethylene (PE), cyclic olefin copolymers (COC), cyclic olefin polymers (COP), and polystyrene (PS).

Compared to a above described conventional construction, the method of the invention provides a simplification of the process and the elimination of one layer of a clear film and one layer of a laminating adhesive. At the same time, the production line is very flexible. For example, the transparent plastic films may be reverse-printed just before forming a laminate. Moreover, this new solution does not require an additional layer of polymeric film-forming materials applied on top of the adhesive layer; rather one single non-blocking adhesive layer is converted into one single clear, water-white pressure-sensitive adhesive layer which fulfils the requirements of the demanding beverage industry for transparent labels.

A thermally activatable or temperature-switchable adhesive could be achieved, for example, but not exclusively, by using an acrylic polymer dispersion polymerised using the core-shell technique which will be described below. This polymer dispersion forms a non-tacky film when dry.

The adhesive may be such that it has a first morphology which is non-tacky, and a second morphology which is tacky. The adhesive may comprise particles which have hydrophobic cores surrounded by hydrophilic shells. For example, the core may comprise a polymer having a low glass transition temperature, such as a pressure sensitive adhesive, and the shell may comprise a high glass transition temperature polymer. The hydrophobic cores may also be embedded in a hydrophilic polymer matrix.

A release liner is coated with the adhesive, and thus a film layer has been formed on the release liner. Under the application of a suitable impulse of energy, heat or near-infra-red radiation, the morphology of the film is disrupted and the film becomes tacky.

Alternatively, this change from a non-tacky film to that of an adhesive one could be achieved by using side-chain crystallisable polymers whose physical properties can change markedly at a pre-set temperature. For example a non-tacky crystalline film can change to an amorphous pressure-sensitive adhesive coating at a defined temperature.

BRIEF DESCRIPTION OF THE DRAWINGS

In the following, the invention will be described by an example, and by referring to the attached drawings, in which FIG. 1 shows a side view of a bottle provided with labels,
FIG. 2 shows a side view of a battery provided with a label, and
FIG. 3 shows a cross-sectional view of the label of the invention.

DETAILED DESCRIPTION OF EMBODIMENTS OF THE INVENTION

EXAMPLE

A release liner with a base paper and a silicone coating is introduced. The release liner is coated by a non-tacky adhesive, dried and wound to a roll. The roll is kept in a storage until it is needed.

The adhesive may be a core-shell type adhesive by National Starch and Chemical Company (the adhesive type described in patent application US 2007/0014985), or a side-chain crystallisable polymer, such as Intelimer® adhesives by Landec Corporation, or the adhesive may be of the type described in EP 1375358. EP 1375358 describes that the adhesive comprises a thermoplastic resin, a solid plasticizer, an adhesive agent and water. A typical thermoplastic resin is an acrylic resin, a typical solid plasticizer is a hindered phenolic resin, and a typical adhesive agent is a rosin ester resin. The thermoplastic resin, the solid plasticizer and the adhesive agent are non-tacky at room temperature. However, when the adhesive is heated over the melting point of the solid plasticizer, the solid plasticizer melts and liquefies, infiltrates into the thermoplastic resin and the adhesive agent. Thereafter the adhesive agent is softened and becomes tacky.

The roll is later used on a printing machine where a transparent surface film and the release liner are attached to each other. Before attaching the two webs together, the transparent surface film is printed to its reverse side so that desired letters and/or images are formed as a mirror-image.

The non-tacky adhesive is activated e.g. by using heat, infrared radiation, or another suitable method. The activation process makes the adhesive tacky. After activating the adhesive, the transparent surface film is attached to the adhesive of the release liner. The resulting laminate is die-cut, and a waste matrix is removed so that individual labels on the release liner are formed.

The labels are especially useful, for example, in bottles, especially in beer bottles. The application in beer bottles is illustrated in FIG. 1. A beer bottle 1 has been provided with labels 2, one on the neck part of the bottle, and the other on the lower part of the bottle. The labels 2 may comprise prints and/or images as desired.

Another application is battery labels, e.g. labels which form the outer shell of batteries. The application in battery labels is shown in FIG. 2. A battery 3 provided with poles 4, 5 has been wrapped with a label 2, which comprises prints and/or images.

A common structure of a label 2 with a release liner is illustrated in FIG. 3. The label 2 comprises a transparent plastic film 2a, a printed layer 2b comprising prints and/or images, and an adhesive layer 2c comprising a single layer of an adhesive. The adhesive is such that it can be activated so that its behaviour changes from non-tacky to tacky. There is a release liner 6 underneath the label 2. The release liner 6, such as a PET release liner or a release paper, is provided with a siliconized layer 6a. The release liner 6 may be a continuous web onto whose surface the sequential labels lay. FIG. 3 shows the label in a printer 7.

The invention claimed is:

1. A method for manufacturing a label laminate, comprising:
    introducing into a printer a transparent plastic film having a first side and a second side,
    printing the second side of the transparent plastic film,
    introducing into the printer a release liner wound on a roll, the release liner having a release surface and which release surface is coated with a single layer of a non-tacky adhesive,
    activating in the printer the non-tacky adhesive on the release surface during printing so that the non-tacky adhesive becomes tacky, and
    attaching the tacky adhesive on the release surface to the second side of the transparent plastic film by the printer to form a pressure-sensitive label laminate.

2. The method according to claim 1, wherein the adhesive comprises particles which have a hydrophobic core and a hydrophilic shell.

3. The method according to claim 1, wherein the adhesive comprises particles having a hydrophobic core embedded in a hydrophilic matrix.

4. The method according to claim 1, wherein the adhesive comprises side-chain crystallisable polymers.

5. The method according to claim 1, wherein the adhesive comprises a thermoplastic resin, a solid plasticizer and an adhesive agent.

* * * * *